March 28, 1961

R. ADLER ET AL 2,977,414

CONTROL SYSTEM

Filed Dec. 6, 1957

2 Sheets-Sheet 1

INVENTORS:
ROBERT ADLER
MYRON L. ANTHONY
BY Thomas E. Dorn
Atty.

INVENTORS:
ROBERT ADLER
MYRON L. ANTHONY
BY Thomas E. Dorn
ATTY.

④ United States Patent Office 2,977,414

Patented Mar. 28, 1961

2,977,414

CONTROL SYSTEM

Robert Adler, Northfield, and Myron L. Anthony, La Grange, Ill., assignors, by mesne assignments, to Peter G. S. Mero Filed Dec. 6, 1957, Ser. No. 701,050

10 Claims. (Cl. 178—18)

This invention relates to control apparatus for use in an intelligence communication system and more particularly to a system for controlling movement of a recording stylus into and out of recording position with respect to a recording medium.

In an intelligence communication system in which data is simultaneously recorded in written form at both a transmitter station and a receiver station, one of the most difficult problems in control of the receiver station is presented by the necessity of determining when the recording element or stylus at the transmitter is actually in recording position. For example, in a tele-autographic system in which a message written on a suitable recording medium, such as paper, at a transmitter is reproduced on a similar recording medium at a receiver, it is essential that the recording stylus at the receiver be engaged and disengaged with the recording medium in synchronism with corresponding movements of the transmitter stylus. Preferably, an electrical signal is generated at the transmitter to afford a positive indication as to whether or not the transmitter stylus is in contact with the recording medium at any given time.

Conventionally, in communication systems of this kind, the requisite stylus control signal is generated by an electrical circuit including a pressure-responsive switch connected to the transmitter stylus. A switch of this kind may be utilized to complete or to open an electrical circuit whenever the stylus is depressed with sufficient force to bring it into contact with the recording medium at the transmitter. A highly sensitive switch is usually employed, particularly where the transmitter stylus is manually controlled, since the pressure exerted upon the stylus by different operators may vary to a substantial degree. A switch of this kind may present difficult problems in its mechanical design. Moreover, the pressure-responsive switch materially complicates the design of the transmitter stylus and associated control arrangements, especially if the switch is mounted on the stylus.

Even the most sensitive of switches, however, leaves much to be desired in communication systems of this kind. Any switch must have a finite open-close force differential; consequently, it cannot afford a really accurate indication of whether or not the stylus at the transmitter is marking the recording medium. This is especially true in the case of handwriting, where the amplitude of the up-and-down movements of the stylus and the engagement pressure varies substantially. Clearly legible handwriting can be accomplished by movements which lift the stylus from the paper by as little as 0.001 inch; a switch capable of detecting movements of this magnitude is almost impossible of construction.

It is a primary object of the invention, therefore, to afford a new and improved stylus control system for an intelligence communication system of the kind in which a recording stylus at a receiver is controlled by movement of a recording stylus at a transmitter.

Another object of the invention is a new and improved stylus control system which is substantially independent of the mechanical characteristics of the stylus actuating apparatus.

A further object of the invention is a new and improved stylus control system which requires no switching apparatus.

Another object of the invention is a new and improved stylus control system which affords a highly accurate and instantaneous indication of contact between a recording stylus and a recording medium.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

Figures 1, 2:
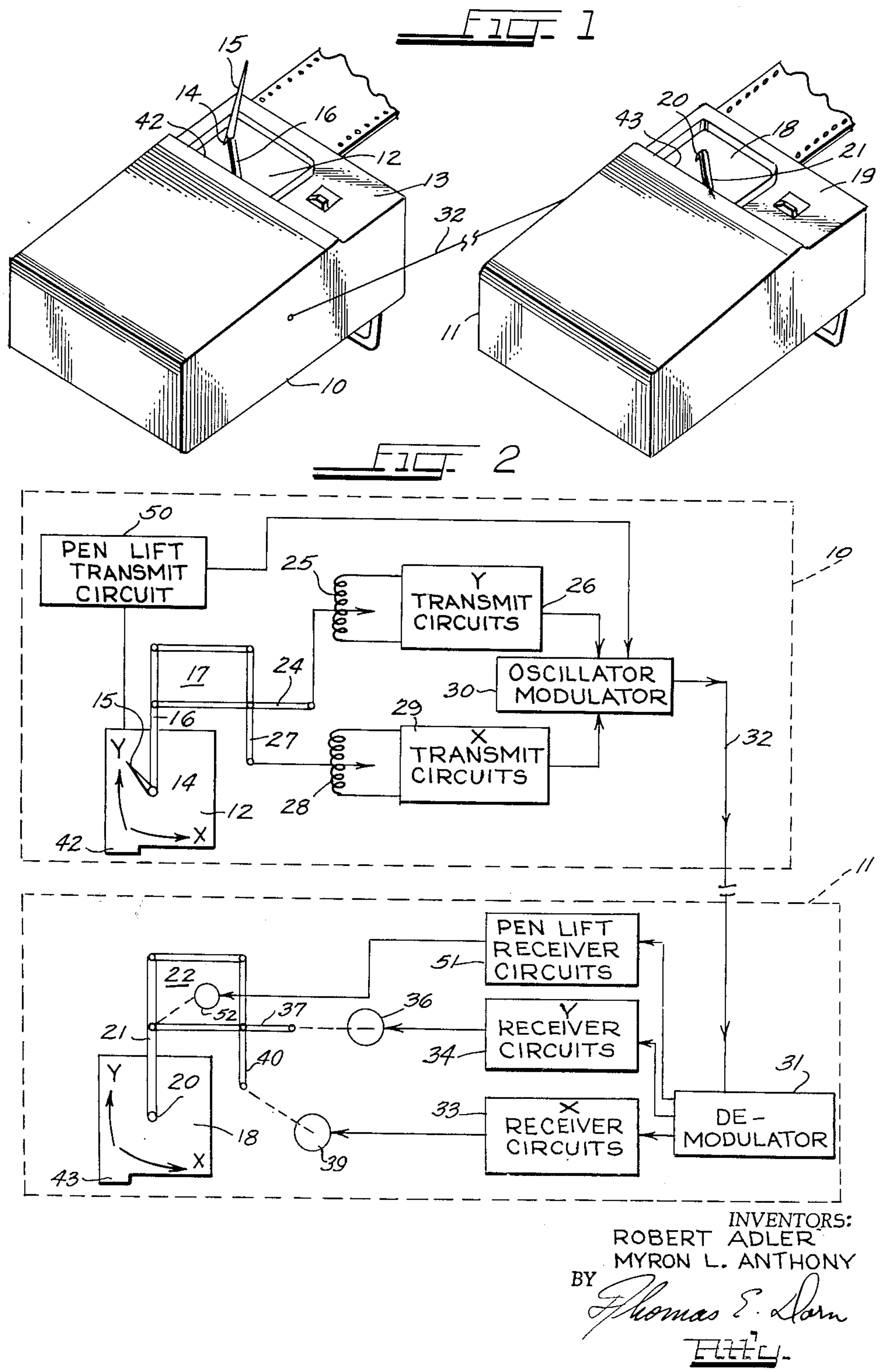
Fig. 1 is a perspective view of an intelligence communication system in which the invention may be employed.
Fig. 2 is a schematic diagram of a tele-autographic communciation circuit and apparatus which may be employed in the system of Fig. 1.

The tele-autographic communication system illustrated in Figs. 1 and 2 comprises a transmitting station 10 and a receiving station 11. In a typical system, each of the units 10 and 11 may be adapted to function as either a transmitter or a receiver. In order to simplify the description of the invention, however, it is assumed herein that unit 10 functions as a transmitter and that the device 11 constitutes a receiver.

The transmitter 10 includes a writing surface 12 which is enclosed by a frame 13. A recording stylus 14 is supported above the writing surface 12 and may be moved into and out of engagement with the writing surface by means of the pen-like stylus actuator 15. Stylus 14 is supported upon a link 16 which comprises a part of a pantograph linkage 17, as best shown in Fig. 2. A sheet of paper or other suitable recording medium is supported upon the writing surface 12. Thus, the pen or actuator 15 may be utilized to guide the stylus 14 into and out of contact wtih the paper and to move the stylus across the paper as desired to write or to form an image on the paper.

The receiver 11 is in many respects essentially similar in construction to the transmitter 10. It includes a writing surface 18 bounded by a frame 19 and having a sheet of paper or other suitable recording medium support thereon. The receiver further includes a recording stylus 20 supported upon an arm or link 21 which constitutes a part of the receiver recording linkage or pantagraph 22 (Fig. 2).

One arm 24 of the transmitter linkage 17 is connected to a variable impedance 25 which may comprise a variable capacitor or a variable inductor as illustrated. The inductor 25 is electrically connected to and forms a part of the Y-coordinate transmitter circuit 26. Similarly, a second arm 27 of the linkage is mechanically connected to a variable inductor 28 which comprises a part of the X-coordinate transmitter circuit 29. The two coordinate signal circuits 26 and 29 may be coupled to an oscillator-modulator 30, the output of which is electrically coupled to a suitable demodulator 31 at the receiver 11 as by means of the conductor 32.

In the receiver 11, the demodulator 31 is electrically coupled to two receiver circuits 33 and 34, which control the X and Y coordinate movements, respectively, of the receiver stylus 20. The Y-coordinate receiver circuit 34 is electrically coupled to a motor or other suitable actuating device 36 which in turn is mechanically linked to an arm 37 of the receiver linkage 22. Similarly, the X-coordinate receiver circuit 33 is coupled to a second motor 39 which is mechanically linked to an arm 40 of the linkage 22.

The tele-autographic communication system illustrated in Figs. 1 and 2 is essentially similar in construction and operation to the system described and claimed in Patent No. 2,583,720, issued January 29, 1952, to Robert Adler and the parallel linkage systems 17 and 22 are described and claimed in Patent No. 2,583,535 to Robert Adler, issued January 29, 1952, both of these patents being assigned to the same assignee as the present invention. Accordingly, only a relatively brief description of the operation of the system is necessary herein.

Movement of the transmitter stylus 14 along the Y axis indicated in Fig. 2 results in a corresponding movement of the variable element of inductor 25. Consequently, this movement of the stylus may be utilized to vary the frequency of a coordinate control signal generated in circuit 26. Similarly, movement of the transmitter stylus 14 along the X axis indicated in Fig. 2 can be employed to vary the frequency of a second coordinate control signal generated in circuit 29. The two frequency-modulated coordinate control signals are then applied to the oscillator-modulator unit 30 to modulate a suitable carrier signal which is transmitted to the receiver along line 32 and demodulated in circuit 31. The demodulated signal is applied to circuits 33 and 34, which may include suitable filters for segregating the X-coordinate signal from the Y-coordinate signal. The output signals from circuits 33 and 34 are applied to the control motors 39 and 36 respectively to drive the parallel linkage 22 and to move the stylus 20 across the writing surface 18 in synchronism with movement of the stylus 14 across the transmitter writing surface 12. Accordingly, the receiver stylus traces a path on the surface 18 similar to that traced by the transmitter stylus upon the surface 12.

When the recording media upon writing surfaces 12 and 18 have been filled completely with writing or other data, or when for some other reason it is desired to advance a new section or portion of the recording media onto the writing surfaces, the transmitter pen may be driven into a recess or well 42 of the frame 13. This movement of the stylus may be utilized to generate a paper-fed control signal which drives the stylus 20 into the corresponding recess 43 in frame 19. The resulting movement of the receiver stylus 20 may be employed to control a paper-feed mechanism incorporated in the receiver; a paper-feed control apparatus of this kind is described and claimed in Patent No. 2,621,249 to T. I. Ress, issued December 9, 1952, and assigned to the same assignee as the present invention.

If the receiver stylus 20 were maintained continuously in contact with the recording medium on writing surface 18, it would not be possible to reproduce many forms of intelligence in legible or interpretable form at the receiver. For example, in written communications it is usually necessary that the stylus 20 be moved from its recording or contact position to an inactive or non-recording position each time a word is terminated and another word is to be started. At the same time, it is usually necessary to continue the transverse movement of the stylus with respect to the writing surface 18 in order to bring the receiver stylus into position for beginning the next word. The same requirements are present for other types of data which may be transmitted over the communication system, including drawings, sketches, and other information. Consequently, a control circuit 50 is incorporated in the transmitter 10 and is utilized to generate a control signal which is representative of movement of the stylus 14 into and out of recording position with respect to the recording medium disposed on writing surface 12. The control signal must afford an accurate and instantaneous indication of marking contact between the transmitter stylus 14 and its associated recording medium, regardless of the magnitude of the stylus movements. It is this control circuit 50, designated as the "pen lift" transmit circuit in Fig. 2, which comprises the subject matter of the present invention. The control signal generated by circuit 50 is applied to oscillator modulator 30 for modulation with the carrier signal. In the receiver 11, the demodulated carrier signal is applied to the pen lift receiver circuit 51 to develop a suitable actuating signal which is applied to a suitable motor or other apparatus 52 which is mechanically coupled to the receiver stylus 20. Thus, the motor or other signal-controlled device 52 is utilized to move the receiver stylus 20 into and out of recording position with respect to the receiver recording medium in synchronism with the corresponding movements of the transmitter stylus 14.

Figures 3, 4, 5, 6, 7:
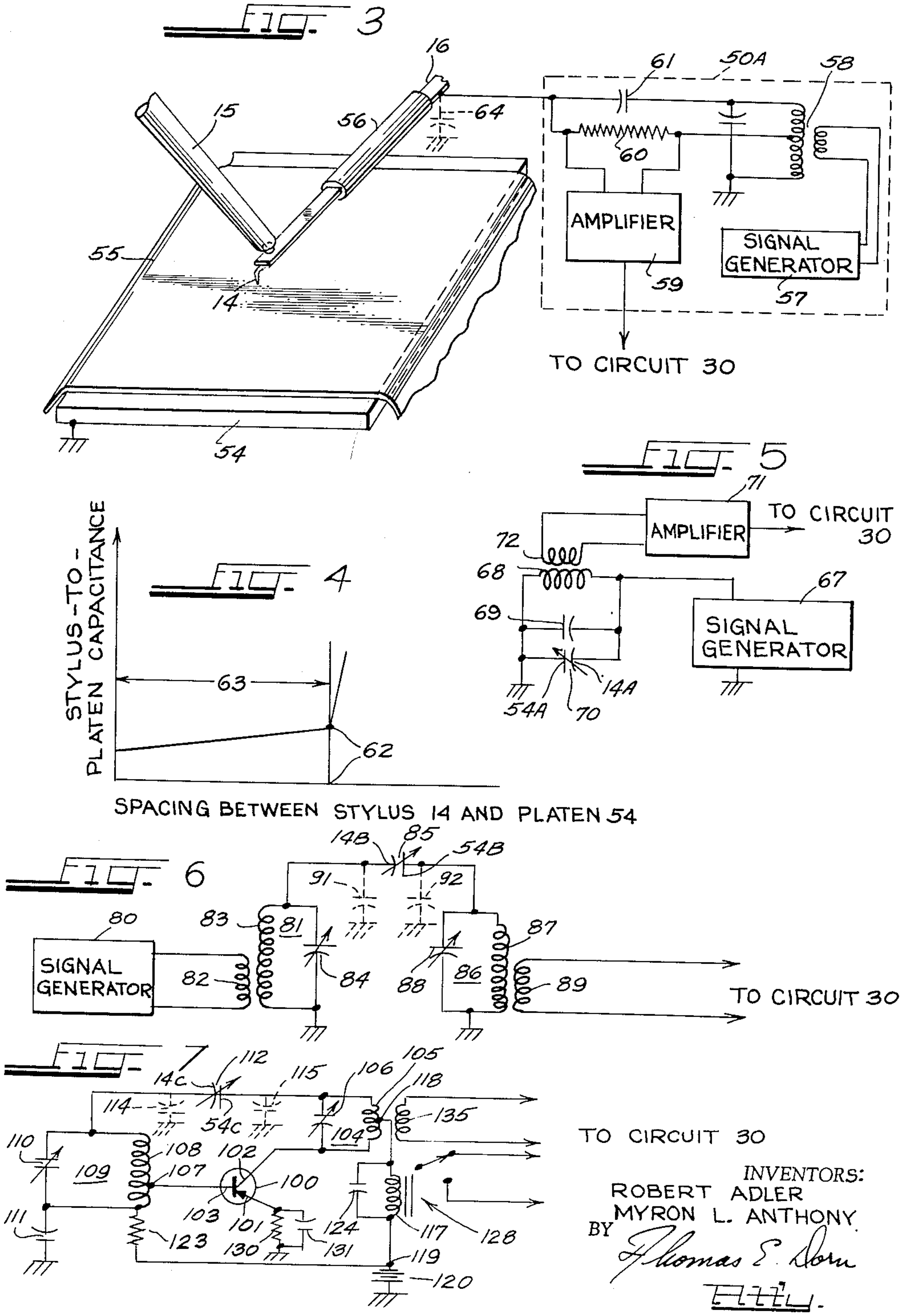
Fig. 3 illustrates one embodiment of the invention, partly in schematic form.
Fig. 4 is an explanatory diagram illustrating certain operating characteristics of the invention.
Fig. 5 is a schematic diagram of a further embodiment of the invention.
Fig. 6 is a schematic diagram of a substantially different embodiment of the invention.
Fig. 7 is a schematic diagram of yet another materially different embodiment of the invention.

Fig. 3 illustrates an extremely simple embodiment of a stylus control system constructed in accordance with the inventive concept. In this view, the stylus support 14, the stylus support arm 16, and the pen or stylus actuator 15 are shown in perspective, together with a platen 54 which defines the writing surface of the transmitter. A recording medium is supported upon the platen 54 in position to be engaged by the stylus 14 and is represented by a sheet of paper 55 which extends across the platen. The stylus 14 is constructed of electrically conductive material and may comprise a relatively small hollow tube through which ink may be fed from a suitable ink reservoir (not shown). In other instances, the stylus 14 may comprise a heating element for recording upon a heat-sensitive paper or other recording medium. In still another possible arrangement, the stylus 14 may be physically combined with the pen or actuator 15, in which case the ink reservoir may be located within the member 15. The critical requirement for the stylus 14 is that it comprise electrically conductive material and that some means be afforded for making an electrical connection thereto. In the illustrated embodiment, the stylus 14 is electrically connected to the supporting link or arm 16, which is also fabricated from a suitable conductive material and which may be encased in an insulator sleeve as indicated by reference numeral 56.

The stylus control system of Fig. 3 further includes a pen lift transmit circuit 50A comprising a signal generator 57 which is electrically coupled to the stylus support link 16. The coupling circuit includes a transformer 58 having one winding connected to the signal generator 57. A center tap on the secondary winding of the transformer 58 is connected to the support link 16 through a load impedance 60; one terminal of the secondary winding is grounded and the other terminal is connected to the support link 16 by a neutralizing capacitor 61. A tuning capacitor may be connected across the transformer secondary. The load impedance 60 is electrically connected to the input circuit of an amplifier 59 which, in turn, is coupled to the transmitting circuit 30 (see Fig. 1). The conductive platen 54 is grounded, as is one terminal of the output circuit for the signal generator 57. The signal generator 57 may comprise any circuit capable of developing an output signal of usable amplitude and may constitute a simple oscillator, an amplifier for an externally developed signal, or any other suitable device.

In reaching an understanding of the operation of the control system illustrated in Fig. 3, the explanatory diagram of Fig. 4 is of material assistance. In this figure, the capacitance between stylus 14 and platen 54 of the control system is plotted as a function of the spacing between the stylus. As indicated therein, the capacitance increases at a substantially linear rate during an interval 63 as the stylus approaches the platen. At the point of contact between the stylus 14 and recording medium 55, however, indicated at point 62 in the diagram, an abrupt transition takes place. The capacitance between the stylus and platen increases abruptly from the value indicated at point 62 to a substantially greater value, thereby markedly decreasing the electrical impedance between these two members of the control system. This is particularly noticeable in a system in which the stylus records upon the paper or other medium 55 by means of a liquid ink, although the same general type of transition is evidenced in other systems as well.

Operation of the control system of Fig. 3 is predicated upon variations in the effective impedance between the transmitter stylus 14 and conductive platen 54 which occur whenever the stylus is brought into engagement with or removed from contact with the recording paper 55. Assuming that signal generator 57 develops a signal of substantially constant amplitude, the same voltage may be developed across the output impedance 58 when the stylus 14 is not in contact with the recording paper 55, since the output impedance is coupled to ground through the stray capacitance 64 of the stylus and link 16 with respect to ground. The stray capacity is substantially neutralized in the illustrated circuit, however. Whenever stylus 14 makes contact with the recording paper 55, the abrupt increase in capacity between the stylus and the grounded platen 54 substantially reduces the impedance of the signal generator output circuit and increases the voltage appearing across output resistor or other impedance 60. The resulting changes in the voltage across impedance 60 afford a control signal which varies in amplitude in accordance with the variations in effective impedance, in this instance capacitance between the transmitter stylus and transmitter platen. This control signal may be amplified in the circuit 59 and applied to circuit 30 (Fig. 1) for transmission to the receiver 11. In the receiver 11, the stylus control signal is employed to control the pen lift actuating means 51, 52 and thus moves the receiver stylus 20 into and out of engagement with the writing surface of the receiver in synchronism with the corresponding movements of the transmitter stylus 14.

In the embodiment of Fig. 3, the stylus control signal is modulated in amplitude to indicate movement of the transmitter stylus 14 into and out of engagement with the recording medium 55. It is also possible to employ other forms of signal modulation without in any way departing from the inventive concept. A simple arrangement of this kind is illustrated in Fig. 5, which shows the electrical circuit of a further embodiment of the invention. In this control system, a signal generator 67 is provided with a parallel-resonant output circuit comprising an inductor 68 and a capacitor 69. The output circuit 68, 69, may, for example, constitute the frequency-determining device of a conventional oscillator, amplifier, or other suitable signal generator. A capacitor 70 is shown connected in parallel with the tuned circuit 68, 69; this capacitor comprises the capacitance between the transmitter stylus 14 and the platen 54, the plates of the capacitor being designated as 14A and 54A. The system may also include an amplifier 71 coupled to the signal generator as by a coil 72 inductably coupled to inductor 69. As in the previous embodiment, the amplifier 71 may be coupled to a suitable transmitting circuit 30.

Operation of the signal control system of Fig. 5 is in many respects essentially similar to that of Fig. 3. In this instance, however, the abrupt changes in the capacitance between the stylus and platen of the transmitter induces changes in frequency of the output signal developed by the signal generator 67. Consequently the system developes a frequency-modulated control signal rather than an amplitude-modulated signal. In all other respects, the system is essentially equivalent to that of Fig. 3.

The embodiments of the invention illustrated and described hereinabove in connection with Figs. 3 and 5 afford substantial advantages as compared with previously known systems. There is no requirement for a switching device of any kind in the pen lift stylus control system, thereby avoiding the substantial design difficulties presented in previously known arrangements. Moreover, these embodiments of the invention are substantially independent of the pressure applied to the stylus by the operator of the transmitter. Both systems afford a highly accurate indication of whether or not the stylus is in marking contact with the paper, a signal which is not dependent upon any mechanical arrangement. Consequently, they afford substantial advantages as compared with previously known pen lift control arrangements. There is one difficulty presented in these arrangements, however, arising out of the presence of the stray capacitance 64 between the stylus 14 and ground.

This capacitance, which may be relatively large depending upon the mechanical and electrical design of the transmitter apparatus, substantially reduces the percentage change in total capacity afforded by movement of the stylus into and out of contact with the recording medium 55. Consequently, relatively small changes in amplitude or frequency may have to be detected. This problem, of course, may be overcome to some extent by neutralization of the stray capacity, as in the embodiment of Fig. 3, but is always present to some degree.

This difficulty is effectively eliminated in the embodiment of Fig. 6. The stylus control system illustrated therein includes a signal generator 80 which is inductively coupled to one of a parallel resonant circuit 81 by means of a coupling coil 82. The tuned circuit 81 comprises an inductor 83 and a capacitor 84. The other terminal of the tuned circuit 81 is electrically connected to the transmitter recording stylus 14B. The stylus 14B is illustrated as one plate of a variable capacitor 85, the other plate of course comprising the transmitter platen, herein designated by reference numeral 54B. Platen 54B, in turn, is connected to one terminal of a parallel resonant circuit 86 comprising a coil 87 and a capacitor 88, the other terminal of the circuit 86 being grounded. The tuned circuit 86 comprises the output circuit of the system and is coupled to the transmitting circuit 30 (Fig. 2) by suitable means such as the coupling coil 89.

In operation, a signal generated in circuit 80 is applied to the tuned circuit 81 through the coupling coil 82. The signal is coupled to the second tuned circuit 86, which comprises the output circuit of the system, through the coupling capacitor 85. Assuming that a constant-frequency signal is employed, and that circuits 81 and 86 are both tuned to the signal frequency, the abrupt variations in capacity between stylus 14B and platen 54B (see Fig. 4) cause equally abrupt changes in the amount of signal energy which is supplied to the output circuit 86. Consequently, the system develops in circuit 86 an amplitude-modulated signal which is representative of movements of the stylus into and out of contact with the recording media at the transmitter. This variable control signal is then transmitted to the receiver, as described above in connection with Fig. 2, to actuate the signal control device 51, 52 which controls movement of the receiver stylus into and out of engagement with the receiver recording medium. A major advantage afforded by the embodiment of Fig. 6, as compared with the systems of Figs. 3 and 5, is in the isolation of the system with respect to the effects of stray capacitance to ground. As in any such system, there may be a substantial stray capacitance 91 between the stylus 14B and ground and a further stray capacitance 92 between the platen 54B and ground. These stray capacitances, however, are not in parallel with the coupling capacitance 85 formed by the stylus and platen members. Rather, they are effectively parallel with the two capacitors 84 and 88 of the resonant circuits 81 and 86. Consequently, the circuit may be adjusted for effective operation substantially independent of the stray capacities. Thus, substantially larger percentage changes in signal amplitude may be realized with less chance of error.

In the embodiment of Fig. 7, the input and output circuits of the embodiment of Fig. 6 are combined with the signal generator to form a simple yet highly effective integrated control system. This embodiment of the invention comprises a transistor 100 having an emitter electrode 101, a collector electrode 102, and a base electrode 103. The transistor 100, in the illustrated circuit, is of the PNP type. The emitter electrode 101 is grounded through a stabilizing resistor 130 which is bypassed by a capacitor 131. The collector electrode is connected to one terminal of a parallel-resonant circuit 104 comprising an inductor 105 and a tuning capacitor 106. The base electrode 103, on the other hand, is connected to a tap 107 on the inductance coil 108 of a second tuned circuit 109 comprising the coil 108 and a tuning capacitor 110. One terminal of the tuned circuit 109 is grounded, through a storage and blocking capacitor 111. The other terminal of the tuned circuit 109 is coupled to tuned circuit 104 through a coupling capacitor 112. The coupling capacitor 112 represents the capacitance between the stylus and platen of the communication system transmitter; accordingly, one plate of this capacitor is designated by reference numeral 14C and the other by reference numeral 54C. The stray capacities of the stylus and platen with respect to ground are indicated at 114 and 115 respectively.

The embodiment of Fig. 7 further includes an output circuit including a relay coil 117 which is connected to a tap 118 on the inductor 105 and to the negative terminal 119 of a D.C. operating source 120, the other terminal of source 120 being grounded. A suitable operating potential for the base electrode of the transistor 100 is provided by a bias resistor 123 connected between the bias source terminal 119 and the coil 108. The coil 117, which is preferably by-passed by a capacitor 124, constitutes the operating coil of a relay 128 which is connected to the pen lift transmit circuit 30 (Fig. 2).

Operation of the embodiment of Fig. 7 is in many respects similar to that of Fig. 6 except that the signal generator function is combined and integrated with the remainder of the system. The transistor 100 and the two tuned circuits 104 and 109, when effectively coupled to each other, constitute an oscillator. The amplitude of the oscillatory signal is dependent upon the impedance of the coupling circuit comprising the capacitor 112 and is therefore determined by the effective impedance, in this instance capacitance, between the stylus 14C and the platen 54C. Accordingly, the abrupt transitions in effective impedance of the coupling capacitance 112 occasioned by movement of the stylus 14C into and out of recording position with respect to the recording medium on platen 54C provide corresponding variations in the amplitude of the oscillatory signal. In fact, the circuit may easily be adjusted to cut off oscillation except when the stylus is in marking contact with the recording medium, and it is highly desirable that the circuit be constructed to operate in this manner.

The transistor 100 functions as a D.C. amplifier as well as an A.C. amplifier. Assuming an effective open circuit at the coupling capacitor 112, with the stylus out of contact with the recording medium, the forward bias applied to the base electrode 103 of the transistor causes the emitter-collector circuit to draw a substantial D.C. current. This current of course passes through the relay coil 117, maintaining the relay 128 in one given operating condition. When the circuit operates as an oscillator, however, as described hereinabove, the oscillatory current is rectified on alternate half cycles and charges the storage condenser 111. This charge on the storage condenser effectively biases the base of the transistor 100 toward cut off and substantially reduces the D.C. current flowing in the emitter-collector circuit of the transistor. By proper selection of the resistor 123, the circuit may be given sufficient self bias when operating as an oscillator to reduce the D.C. component of the emitter-collector circuit current to a very much smaller amplitude than when the oscillator is effectively cut off.

Thus, the relay 128 may be actuated between two different operating conditions in response to variations in the D.C. component of the signal in the emitter-collector circuit of the transistor 100 and may therefore be utilized to control operation of a suitable transmitter circuit 30 (see Fig. 2). In this manner, the control signal may in effect be transmitted to the receiver of the communication system to control movements of a receiver stylus into and out of recording position. Like the embodiment of Fig. 6, the control system of Fig. 7 is essentially independent of the stray capacitance of the stylus and platen members with respect to ground, since the stray capacitance is not in parallel with the effective coupling capacitance 112 between these members. It should also be noted that the circuit of Fig. 7 is essentially self-detecting in its actuation of the control relay 128 and that no rectifier or other detector is necessary, this function being provided by the transistor circuit itself.

It is not essential that a relay or other separate control device be employed in the embodiment of Fig. 7. Rather, the self-detection signal may be employed as a biasing signal to electrically control an oscillator or other control signal generator. Moreover, the control function of the circuit of Fig. 7 may be derived from the oscillator circuit rather than from the D.C. circuit, using the oscillatory signal directly as a modulation signal applied to the circuit 30 (Fig. 2). For example, a coil 135 may be coupled to the oscillator to derive a modulation signal which may be used directly, in which case the relay 128 may be omitted.

In order to afford a more definitive description of this embodiment of the invention, certain data concerning circuit parameters and devices employed in the control system of Fig. 7 are set forth hereinafter. It will be understood that this material is provided solely by way of illustration and in no sense as a limitation upon the invention.

| | | |
|---|---|---|
| Transistor **100** | | 2N321 |
| Relay **128** | ohms | 6000 |
| Capacitor **106** | micromicrofarads | 100 |
| Capacitor **110** | do | 100 |
| Capacitor **111** | microfarads | .01 |
| Capacitor **124** | do | .1 |
| Capacitor **131** | do | .1 |
| Resistor **123** | kilohms | 470 |
| Resistor **130** | ohms | 1000 |
| Source **120** | volts D.C. | 22 |

It will of course be apparent to those skilled in the art that the integrated system of Fig. 7 may also be revised to afford a frequency-modulated or phase-modulated control signal indicative of movements of the stylus into and out of engagement with the recording medium at the transmitter. It is by no means essential that a transistor circuit be utilized, since a vacuum tube or other suitable arrangement may be employed as desired. None of the described embodiments is restricted to a carrier-transmission system of the type shown in Fig. 2 or to the particular stylus linkage illustrated therein; any suitable transmission system may be utilized and the several embodiments may be employed with virtually any stylus-moving mechanism.

In each of the several embodiments of the invention, the desired control signal representative of movements of the transmitter stylus is developed without recourse to any pressure sensitive switch or other switching means. Consequently, the many different problems encountered in design of this portion of the communication system are eliminated completely. Each of the systems affords an accurate and effective indication of transmitter stylus movements into and out of recording position with respect to the recording medium, and therefore permits legible and accurate reproduction of the desired intelligence at the receiver station of the system.

Hence, while we have illustrated and described the preferred embodiments of our invention, it is to be understood that these are capable of variation and modification.

We claim:

1. In a transmitter for an intelligence communication system of the kind comprising a transmitter and a receiver each including a stylus for recording upon a recording medium having predetermined electrical impedance characteristics supported upon an electrically conductive platen, said receiver further including signal-controlled means for moving the receiver stylus into and out of recording position with respect to the recording medium, a stylus control system comprising: means including a signal generator electrically coupled to the stylus and to the platen of the transmitter to generate a control signal which varies in accordance with variations in effective impedance between said transmitter stylus and said transmitter platen and which changes abruptly upon engagement and disengagement of said stylus with said recording medium; and means for transmitting said control signal to signal-controlled means at a receiver to control movement of the receiver stylus between recording and non-recording positions with respect to the receiver recording medium.

2. In a transmitter for an intelligence communication system of the kind comprising a transmitter and a receiver each including a stylus for engaging and recording upon a dielectric medium supported upon an electrically conductive platen, said receiver further including signal-controlled means for moving the receiver stylus into and out of engagement with the recording medium, a stylus control system comprising: means including a signal generator electrically coupled to the stylus and to the platen of the transmitter to generate a control signal which varies in accordance with variations in effective capacitance between said transmitter stylus and said transmitter platen and which changes abruptly upon engagement and disengagement of said stylus with said recording medium; and means for transmitting said control signal to signal-controlled means at a receiver to control engagement and disengagement of the receiver stylus with the receiver recording medium.

3. In a transmitter for an intelligence communication system of the kind comprising a transmitter and a receiver each including a stylus for engaging and recording upon a recording medium having predetermined electrical impedance characteristics supported upon an electrically conductive platen, said receiver further including signal-controlled means for moving the receiver stylus into and out of engagement with the recording medium, a stylus control system comprising: means including a signal generator electrically coupled to the stylus and to the platen of the transmitter to generate a control signal which varies in amplitude in accordance with variations in effective impedance between said transmitter stylus and said transmitter platen and which changes abruptly upon engagement and disengagement of said stylus with said recording medium; and means for transmitting said control signal to signal-controlled means at a receiver to control engagement and disengagement of the receiver stylus with the receiver recording medium.

4. In a transmitter for an intelligence communication system of the kind comprising a transmitter and a receiver each including a stylus member for recording upon a dielectric medium supported upon an electrically conductive platen member, said receiver further including signal-controlled means for moving the receiver stylus into and out of recording position with respect to the recording medium, a stylus control system comprising: a signal generator having an output circuit electrically coupled to one of said stylus and platen members at the transmitter; means including a coupling circuit electrically coupled to the other of said members at the transmitter to generate a control signal which varies in amplitude in accordance with variations in the capacitance between said transmitter stylus and platen members and which changes abruptly upon engagement and disengagement of said stylus with said recording medium; and means for transmitting said control signal to signal-controlled means at a receiver to control movement of the receiver stylus member with respect to the receiver recording medium.

5. In a transmitter for an intelligence communication system of the kind comprising a transmitter and a receiver each including a stylus for recording upon a dielectric medium supported upon an electrically conductive platen, said receiver further including signal-controlled means for moving the receiver stylus into and out of recording position with respect to the recording medium, a stylus control system comprising: means including a signal generator, comprising an oscillator electrically coupled to the stylus and to the platen of the transmitter with the intermember capacity therebetween comprising a series coupling capacitance in the oscillator, for generating a control signal which varies in accordance with variations in effective capacitance between said transmitter stylus and said transmitter platen and which changes abruptly upon engagement and disengagement of said stylus with said recording medium; and means for transmitting said control signal to signal-controlled means at a receiver to control movement of the receiver stylus with respect to the receiver recording medium.

6. In a transmitter for an intelligence communication system of the kind comprising a transmitter and a receiver each including a stylus member for engaging and recording upon a dielectric medium supported upon an electrically conductive platen member, said receiver further including signal-controlled means for moving the receiver stylus member into and out of engagement with the recording medium, a stylus control system comprising: a signal generator including an oscillator comprising an output circuit having one terminal electrically coupled to one of said stylus and platen members at the transmitter and having the other terminal effectively grounded; means including a coupling circuit, having one terminal electrically coupled to the other of said members at the transmitter and having the other terminal effectively grounded, for generating a control signal which varies in accordance with variations in the capacitance between said transmitter stylus and platen members and which changes abruptly upon engagement and disengagement of said stylus with said recording medium; and means for transmitting said control signal to signal-controlled means at a receiver to control engagement and disengagement of the receiver stylus member with the receiver recording medium.

7. In a transmitter for an intelligence communication system of the kind comprising a transmitter and a receiver each including a stylus member for engaging and recording upon a dielectric medium supported upon an electrically conductive platen member, said receiver further including signal-controlled means for moving the receiver stylus member into and out of engagement with the recording medium, a stylus control system comprising: a signal generator including an oscillator comprising a parallel-resonant output circuit having one terminal electrically coupled to one of said stylus and platen members at the transmitter and having the other terminal effectively grounded; means including a parallel-resonant coupling circuit, having one terminal electrically coupled to the other of said members at the transmitter and having the other terminal effectively grounded, for generating a control signal which varies in amplitude in accordance with variations in capacitance between said transmitter stylus and platen members and which changes abruptly upon engagement and disengagement of said stylus with said recording medium; and means for transmitting said control signal to signal-controlled means at a receiver to control engagement and disengagement of the receiver stylus member with the receiver recording medium.

8. In a transmitter for an intelligence communication system of the kind comprising a transmitter and a receiver each including a stylus for recording upon a dielectric medium supported upon an electrically conductive platen, said receiver further including signal-controlled means for moving the receiver stylus into and out of recording position with respect to the recording medium, a stylus control system comprising: means including a signal generator comprising an electric discharge device having an input electrode, an output electrode, and a control electrode, and a feed-back circuit electrically coupling said output electrode to one of said input and control electrodes through a series coupling capacitance including the capacity between said transmitter stylus and platen to generate a control signal which varies in accordance with variations in effective capacitance between said transmitter stylus and said transmitter platen and which changes abruptly upon engagement and disengagement of said stylus with said recording medium; and means for transmitting said control signal to signal-controlled means at a receiver to control movement of the receiver stylus with respect to the receiver recording medium.

9. In a transmitter for an intelligence communication system of the kind comprising a transmitter and a receiver each including a stylus for engaging and recording upon a dielectric medium supported upon an electrically conductive platen, said receiver further including signal-controlled means for moving the receiver stylus into and out of engagement with the recording medium, a stylus control system comprising: means including a signal generator comprising an electric discharge device having an input electrode, an output electrode, and a control electrode, a pair of parallel-resonant circuits individually connected to said output and control electrodes, and a feedback circuit electrically inter-coupling said resonant circuits through a series coupling capacitance including the capacity between said transmitter stylus and platen to generate a control signal which varies in amplitude in accordance with variations in capacitance between said transmitter stylus and said transmitter platen and which changes abruptly upon engagement and disengagement of said stylus with said recording medium; and means for transmitting said control signal to signal-controlled means at a receiver to control engagement and disengagement of the receiver stylus with the receiver recording medium.

10. In a transmitter for an intelligence communication system of the kind comprising a transmitter and a receiver each including a stylus member for engaging and recording upon a dielectric recording medium supported upon an electrically conductive platen member, said receiver further including signal-controlled means for moving the receiver stylus member into and out of engagement with the recording medium, a stylus control system comprising: means including a signal generator electrically coupled to the stylus and platen members at the transmitter to generate a control signal having a given amplitude when said stylus member is engaged with said recording medium and of substantially zero amplitude when said transmitter stylus member is disengaged from said recording medium, including means whereby the amplitude of said control signal is determined by variations in the effective impedance between said transmitter stylus and platen members; and means for effectively transmitting said control signal to signal-controlled means at a receiver to control engagement and disengagement of the receiver stylus member with the receiver recording medium.

References Cited in the file of this patent

UNITED STATES PATENTS

| | | |
|---|---|---|
| 1,722,274 | Clark et al. | July 30, 1929 |
| 1,800,760 | Sleeper | Apr. 14, 1931 |
| 2,186,252 | Little | Jan. 9, 1940 |
| 2,205,531 | Kehm | June 25, 1940 |
| 2,590,294 | Both | Mar. 25, 1952 |
| 2,621,249 | Ress | Dec. 9, 1952 |
| 2,904,631 | Anderson | Sept. 15, 1959 |